(12) United States Patent
Vassieux et al.

(10) Patent No.: US 12,504,056 B2
(45) Date of Patent: Dec. 23, 2025

(54) TORSION DAMPER DEVICE, SEAT FOR A TORSION DAMPER DEVICE AND METHOD FOR MANUFACTURING A TORSION DAMPER

(71) Applicant: VALEO EMBRAYAGES, Amiens (FR)

(72) Inventors: Loic Vassieux, Cergy Pontoise (FR); Dominique Lheureux, Cergy Pontoise (FR); Daniel Vuckovic, Cergy Pontoise (FR); Benoit Perry, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 504 days.

(21) Appl. No.: 17/905,141

(22) PCT Filed: Feb. 25, 2021

(86) PCT No.: PCT/EP2021/054754
§ 371 (c)(1),
(2) Date: Aug. 26, 2022

(87) PCT Pub. No.: WO2021/170757
PCT Pub. Date: Sep. 2, 2021

(65) Prior Publication Data
US 2023/0114805 A1  Apr. 13, 2023

(30) Foreign Application Priority Data
Feb. 28, 2020  (FR) .................................... 20 02046

(51) Int. Cl.
*F16F 15/123* (2006.01)
*F16F 15/12* (2006.01)

(52) U.S. Cl.
CPC .... *F16F 15/12326* (2013.01); *F16F 15/1203* (2013.01)

(58) Field of Classification Search
CPC ............. F16F 15/1203; F16F 15/12326; F16F 15/12333; F16F 15/13438; F16F 15/13446
(Continued)

(56) References Cited

U.S. PATENT DOCUMENTS 5,823,516 A * 10/1998 Despres ............ F16F 15/12313
464/68.92
11,746,832 B2 * 9/2023 Dast .................. F16F 15/12326
464/68.1

FOREIGN PATENT DOCUMENTS

CN 101275613 A 10/2008
CN 109477546 A 3/2019
(Continued)

OTHER PUBLICATIONS

International Search Report issued Jun. 8, 2021 in PCT/EP2021/054754, filed on Feb. 25, 2021, 2 pages.
(Continued)

*Primary Examiner* — Josh Skroupa
(74) *Attorney, Agent, or Firm* — Oblon, McClelland, Maier & Neustadt, L.L.P.

(57) ABSTRACT

A torsion damping device includes: a first coaxial part and a second coaxial part, springs acting circumferentially between the first coaxial part and the second coaxial part, and a plurality of seats, in which at least one of the seats is a seat that can be mounted in a first orientation and in a second orientation, this seat being a worn seat mounted in the second orientation and exhibiting traces of wear caused by previous use in the first orientation.

20 Claims, 10 Drawing Sheets

(58) Field of Classification Search
USPC .................................... 464/68.92; 192/205
See application file for complete search history.

(56) References Cited

FOREIGN PATENT DOCUMENTS

| DE | 196 11 507 | A1 |   | 10/1996 |         |            |
|----|------------|----|---|---------|---------|------------|
| DE | 102018201536 | A1 | * | 8/2019 | ........ | F16F 15/12326 |
| DE | 102019121248 | A1 | * | 2/2021 | ........ | F16F 15/12326 |
| DE | 102020120349 | A1 | * | 2/2021 | ........ | F16F 15/12326 |
| DE | 102019216146 | A1 | * | 4/2021 | ........ | F16F 15/12326 |
| EP | 3026293 | A1 | * | 6/2016 | ........ | F16F 15/12326 |
| FR | 2875882 | A1 | * | 3/2006 | ........ | F16F 15/12326 |

OTHER PUBLICATIONS

Office Action dated Jun. 29, 2025 issued in corresponding Chinese patent application No. 202180017630.8 (with English translation).

* cited by examiner

TORSION DAMPER DEVICE, SEAT FOR A TORSION DAMPER DEVICE AND METHOD FOR MANUFACTURING A TORSION DAMPER

DESCRIPTION

The present invention relates to a torsion damping device, a seat for a torsion damping device and a method for manufacturing a torsion damper.

The damping devices concerned are of the type including two coaxial parts rotatably mounted relative to each other against springs acting circumferentially between them.

Such a torsion damping device is particularly applied in a clutch friction, in particular for a motor vehicle, in particular for trucks, or in a flywheel of such a motor vehicle, in this case commonly called a dual-mass flywheel.

The invention relates more particularly to the situation in which a seat acts circumferentially between at least one of the ends of at least one of the springs and each of the coaxial parts, a frontal part of which seat presses on the spring and a dorsal part of which seat presses against one and/or the other of the coaxial parts.

Such a device is particularly described in EP2094290, FR2627243, FR3079580, EP3026293 and EP0696694.

Such seats can be pivotably mounted relative to the first and second coaxial parts about an axis parallel to the axis of rotation of the damping device. Because they are pivotably mounted, the seats, sometimes called cups, allow the springs to work in satisfactory conditions, even at full torque, particularly by maintaining a degree of parallelism between the ends thereof.

The seats are generally made from steel, typically cast steel, and can optionally act as a support for end pieces made from an elastic or plastic material that operate as stops at full torque before certain springs press against it until their turns are contiguous. They can also be entirely made from an elastic or plastic material, and be manufactured by moulding in particular.

These seats tend to wear, however, and become hollowed out in the bearing zones that are in contact with the first and second coaxial parts, in particular in the upper part of the pivot thereof, that is, the part of the pivot situated radially outwards. This localized wear on the upper part of the pivots is caused by the friction of the seat against the first and second coaxial parts when the springs and seats are subjected to significant centrifugal forces or to significant pressure applied by the torque transmitted between the first and second coaxial parts or on return to the neutral position (or zero torque).

In other words, in use, the bearing zones of the seats will wear thin and become hollowed out. This can lead to premature wear of the seats and malfunctions of the torsion damping device.

The present invention particularly aims to increase the service life of the seats and reduce the cost of manufacturing a torsion damping device.

To this end, the invention relates to a torsion damping device including:
a first coaxial part and a second coaxial part rotatably mounted relative to each other about an axis of rotation (X),
springs acting circumferentially between the first coaxial part and the second coaxial part so that they elastically oppose the relative rotation of the first coaxial part and the second coaxial part about the axis of rotation (X),
a plurality of seats, each seat comprising a frontal part that presses against a spring end, and a dorsal part pressing on the first coaxial part and/or the second coaxial part.

According to a first aspect of the invention, one of the seats is a seat that can be mounted in a first orientation and in a second orientation, this seat being a worn seat exhibiting traces of wear.

"Traces of wear" is given to mean wear marks visible to the naked eye.

These traces of wear can particularly correspond to portions of the seat that have been hollowed out previously by the seat, mounted in the first orientation, pressing against the first and/or second coaxial parts of a worn damping device.

"Worn damping device" is given to mean a damping device that has already been used on a first vehicle in circulation and has been sent to a recycling channel due to presumed or observed faults in the use thereof on the first vehicle.

According to one embodiment, the worn seat is mounted in the second orientation and exhibits traces of wear caused by previous use in the first orientation.

The seat can thus be mounted initially in two different positions and can be reused in one of the two positions in order to extend its service life. The proportion of waste in a worn damping device is thus reduced. In other words, a seat can be:
used in a first orientation in a first damper during a first life cycle,
then, having been removed from the first damper, reused in a second orientation in a second damper during a second life cycle.

The damping device provided with the worn seat mounted in the second orientation is thus cheaper while having damping properties that are substantially equivalent to an equivalent damping device provided with new seats only.

The torsion damping device associated with the second life cycle of the seat can also have one or more of the following features:
 The dorsal part of each worn seat comprises a dorsal face and at least one bearing relief protruding from the dorsal face and arranged to press against the first coaxial part and/or the second coaxial part, the traces of wear being situated more than 90% or fully on said at least one bearing relief.
 The dorsal part of each worn seat comprises a dorsal face and at least one bearing relief protruding from the dorsal face and arranged to press against the first coaxial part and/or the second coaxial part, said at least one bearing relief comprising, when viewed in a plane perpendicular to the axis of rotation (X):
a summit,
a first wall,
a second wall connected to the first wall by means of the summit and situated radially outside the first wall,
the traces of wear being situated partially or fully on the first wall.
 The traces of wear situated on the first wall of the worn seat were caused during the previous use when the seat was used in the first orientation, that is, when the first wall of the seat positioned in the first orientation corresponded to the radially outer wall of the bearing relief.
 The second wall is capable of interacting with a bearing portion formed on the first coaxial part and/or on the second coaxial part so that the worn seat is radially retained when it is subjected to centrifugal forces.

At a high speed of the torsion damping device situated in the normal operating range of the torsion damping device, the seats can be centrifuged and the radially outer walls of the bearing reliefs are pressed on the first coaxial part and/or the second coaxial part.

Said at least one bearing relief extends in a direction parallel to the axis of rotation X.

The summit of the worn seat comprises a demarcation separating the first wall from the second wall. Thus it is easier to check, on dismantling, whether the wear is concentrated solely on the first wall or rather whether the wear extends to both the first wall and the second wall. Thus, when wear is concentrated on the first wall on just one side of the demarcation, the seat can be turned around for reuse. Conversely, if the wear is spread across both sides of the demarcation during the first use, the seat can no longer be reused in the second orientation. Thus, the line visually indicates a limit that the wearing marks must not reach during the first use if the seat is to be reused in the second orientation.

The demarcation may be a groove. The demarcation may also be a line marked across the summit of the seat.

The demarcation extends along an axis parallel to the axis of rotation X. The summit can be a crest extending along an axis parallel to the axis of rotation X and separating the first wall and the second wall.

The first wall and the second wall extend in a direction parallel to the axis of rotation X.

The second wall faces radially outwards so that it is radially retained by the bearing portion formed on the first coaxial part and/or on the second coaxial part. A portion facing radially outwards does not necessarily extend strictly in the circumferential direction but can have a radial component.

The traces of wear of each worn seat are situated partially or fully outside the second wall. For example, more than 90% of the traces of wear are situated outside the second wall.

The traces of wear of each worn seat are situated partially or fully on the first wall.

The second orientation of the worn seat in the torsion damping device corresponds to the rotation of the worn seat by 180 degrees relative to its previous use in the first orientation. In other words, the worn seat is reused back to front.

The spring associated with the worn seat extends about an axis Y.

The seat has an axis of rotation Y' situated substantially in the continuation of the axis Y of the associated spring.

The worn seat is rotated between its first orientation and its second orientation about the axis Y' of the seat.

The rotation is a 180-degree rotation.

The worn seat comprises a frontal face arranged to press against a spring end.

The frontal face of the worn seat is arranged perpendicular to the axis Y of the spring.

The worn seat is a seat pivoting about an axis parallel to the axis of rotation X of the damping device and said at least one bearing relief is a pivot lug.

The worn seat comprises a first axial clamping arrangement comprising walls for axially clamping the worn seat relative to the first coaxial part and the second coaxial part, and a second axial clamping arrangement also comprising walls for axially clamping the worn seat relative to the first coaxial part and the second coaxial part, the first axial clamping arrangement and the second axial clamping arrangement being arranged on either side of the pivot lug, the axial clamping walls of the first axial clamping arrangement being arranged in the same planes as the axial clamping walls of the second axial clamping arrangement.

The turning around of the seat for the second use thereof in the second orientation does not thus affect the axial clamping of the components. The worn seat has been used previously with the first axial clamping arrangement positioned radially outside the pivot lug and the worn seat is used in the torsion damping device with the second axial clamping arrangement positioned radially outside the pivot lug.

The pivot lug formed on the dorsal part of the worn seat is inserted into a first housing formed on the first coaxial part and/or a second housing formed on the second coaxial part, the pivot lug being pressed into the first housing of the first coaxial part and/or into the second housing of the second coaxial part.

The pivot lug is in the shape of a bar portion.

The worn seat is made from metal, for example steel.

One of the first coaxial part and the second coaxial part comprises two lateral washers rigidly connected to each other for conjoint rotation about the axis of rotation (X), and the other of the first coaxial part and the second coaxial part comprises an intermediate washer arranged about the axis of rotation (X) and axially between the two lateral washers, the springs of the torsion damping device being arranged in recesses in the intermediate washer and in the lateral washers so that they are circumferentially compressed when the lateral washers and the intermediate washer of the damper move away from a relative angular rest position, in other words when they rotate relative to each other.

The first axial clamping arrangement and the second axial clamping arrangement each comprise a first rib and a second rib between which an edge face of the intermediate washer is inserted.

For each axial clamping arrangement, the first rib comprises an outer wall against which one of the two lateral washers can press axially and an inner wall against which the intermediate washer can press axially.

For each axial clamping arrangement, the second rib comprises an outer wall against which the other of the two lateral washers can press axially and an inner wall against which the intermediate washer can press axially.

In other words, for each axial clamping arrangement, the edge faces of the two lateral washers are positioned axially on either side of the two ribs and an edge face of the intermediate washer is positioned axially between the two ribs.

The first axial clamping arrangement is symmetrical to the second axial clamping arrangement relative to the axis of rotation Y' of the worn seat used to switch it from the first orientation to the second orientation.

When it is viewed along the axis Y of the spring, the worn seat has an outline that has an axis of symmetry.

According to one embodiment, the worn seat generally has one axis of symmetry overall.

According to one embodiment, the axis of symmetry is the axis Y' of the seat or the axis Y of the associated spring.

According to one embodiment, the worn seat comprises a mounting poka-yoke suitable for preventing the worn seat from being mounted in the torsion damping device in the first orientation.

According to one embodiment, the symmetry of the worn seat is only broken by the mounting poka-yoke and/or the traces of wear.

The invention also relates to a seat (worn or otherwise) for a torsion damping device comprising, on the one hand, a frontal part which is intended to press against one end of a spring and, on the other hand, a dorsal part which is intended to press against a first coaxial part and/or a second coaxial part of a torsion damping device, wherein the seat can be mounted in a first orientation and in a second orientation in the torsion damping device.

This seat can include one or more of the following features:

The dorsal part comprises a dorsal face and at least one bearing relief protruding from the dorsal face and arranged to press against the first coaxial part and/or the second coaxial part, said at least one bearing relief comprising, when viewed in a plane perpendicular to the axis of rotation (X):

a summit,
a first wall,
a second wall connected to the first wall by means of the summit and situated radially outside the first wall.

The first wall and the second wall are arranged on either side of an axis perpendicular to the dorsal face and passing through the summit.

The bearing relief extends in a direction parallel to the axis of rotation X.

The summit of the seat comprises a demarcation separating the first wall from the second wall. As explained above, it is thus easy to determine whether the signs of wear affect both walls or just one.

The demarcation is a groove.

The seat is a seat pivoting about an axis parallel to the axis of rotation X of the damping device and said at least one bearing relief is a pivot lug.

The dorsal part is arranged in a plane P and the bearing relief is a bar portion having, on one surface, a substantially circular cross section of centre C, the bar portion forming one element of a pivot connection, the axis of the bar portion passing through the centre C of the bar portion extending at a predetermined distance d not substantially equal to zero from the plane P.

For a radius r of the substantially circular cross section of the bar portion, d>r/3 and preferably d>r/2, in particular d>2r/3 and notably d>r.

The seat comprises a first axial clamping arrangement comprising walls for axially clamping the seat relative to the first coaxial part and the second coaxial part, and a second axial clamping arrangement also comprising walls for axially clamping the seat relative to the first coaxial part and the second coaxial part, the first axial clamping arrangement and the second axial clamping arrangement being arranged on either side of the pivot lug, the axial clamping walls of the first axial clamping arrangement being arranged in the same planes as the axial clamping walls of the second axial clamping arrangement.

The first axial clamping arrangement is symmetrical to the second axial clamping arrangement relative to the axis of rotation Y' of the seat used to switch it from the first orientation to the second orientation.

When it is viewed along the axis Y, the seat has an outline that has an axis of symmetry.

According to one embodiment, the seat generally has one axis of symmetry overall.

The seat comprises a mounting poka-yoke.

The seat may of course include any feature already mentioned hereinabove in connection with the torsion damping device.

The invention also relates to a torsion damping device including:

a first coaxial part and a second coaxial part rotatably mounted relative to each other about an axis of rotation X, springs acting circumferentially between the first coaxial part and the second coaxial part so that they elastically oppose the relative rotation of the first coaxial part and the second coaxial part about the axis of rotation X, a plurality of seats, each seat comprising, on the one hand, a frontal part that presses against a spring end, and, on the other hand, a dorsal part pressing on the first coaxial part and/or the second coaxial part, in which at least one of the seats is a seat as described hereinabove.

The device can include one or more of the following features:

Said at least one of the seats is a worn seat and exhibits traces of wear brought about by previous use in the first orientation.

The traces of wear are situated partially or fully on the first wall.

The traces of wear of each worn seat are situated partially or fully outside the second wall.

The traces of wear of each worn seat are situated partially or fully on the first wall.

The second orientation of the seat corresponds to the rotation of the seat by 180 degrees relative to the first orientation.

The invention also relates to a method for manufacturing a torsion damper including a first coaxial part and a second coaxial part rotatably mounted relative to each other about an axis of rotation X, springs housed in recesses in the first and second coaxial parts and acting circumferentially between the first coaxial part and the second coaxial part so that they elastically oppose the relative rotation of the first coaxial part and the second coaxial part about the axis of rotation X, a plurality of seats, each seat comprising a frontal part that presses against a spring end and a dorsal part pressing on the first coaxial part and/or the second coaxial part, the manufacturing method comprising the following steps:

supplying a worn seat exhibiting traces of wear, mounting the worn seat on a spring, inserting the assembly comprising the worn seat and the spring into a recess in the first coaxial part and into a recess in the second coaxial part.

The worn seat can have one or more of the features cited above.

The method can include one or more of the following features:

Each worn seat is capable of being mounted in a second orientation and a first orientation.

The worn seat has been mounted in the first orientation during a previous use, and the step of inserting the assembly comprising the worn seat and the spring is such that the worn seat is mounted in the second orientation in the recesses in the first and second coaxial parts.

The dorsal part of each worn seat comprises a dorsal face and at least one bearing relief protruding from the dorsal face and suitable for pressing against the first coaxial part and/or the second coaxial part, the bearing relief comprising:

a summit,
a first wall exhibiting traces of wear,
a second wall connected to the first wall via the summit, and the step of inserting the assembly comprising the spring and the bearing seats being such that, when the worn seat is viewed in a plane perpendicular to the axis of rotation (X), the first wall is located in the torsion damping device radially inside the second wall.

Advantageously, the second wall has no traces of wear.

The worn seat comprises a first axial clamping arrangement and a second axial clamping arrangement suitable for interacting with first and second coaxial parts of the torsion damping device, the first axial clamping arrangement and the second axial clamping arrangement being situated on either side of a pivot lug of the worn seat, the worn seat having been used previously, in the first orientation, with the first axial clamping arrangement positioned radially outside the pivot lug and the worn seat being suitable for use in the torsion damping device, in the second orientation, with the second axial clamping arrangement positioned radially outside the pivot lug.

Where appropriate, said at least one bearing relief is partially or fully formed by the pivot lug.

The worn seat includes a mounting poka-yoke and, during the step of inserting the assembly comprising the worn seat and the spring into the first and second coaxial parts, the assembly comprising the worn seat and the spring passes through a mounting template before being introduced into the recesses in the first and second coaxial parts, the mounting template including a complementary poka-yoke, the complementary poka-yoke being arranged so that the mounting template only permits the passage of the worn seat in the second orientation.

The poka-yoke of the worn seat is formed on one of the first axial clamping arrangement and the second axial clamping arrangement.

Advantageously, prior to the step of supplying a worn seat exhibiting traces of wear, the manufacturing method comprises the following steps:
dismantling a worn damper,
storing the seats from the worn damper.

According to one variant, one of the first coaxial part and the second coaxial part comprises two lateral washers rigidly connected to each other for conjoint rotation about the axis of rotation (X), and the other of the first coaxial part and the second coaxial part comprises an intermediate washer, the two lateral washers and the intermediate washer originating from the worn damper. In other words, this can be a method for repairing the worn damper.

The invention also relates to the use of a worn seat for manufacturing a torsion damping device.

The worn seat and the torsion damping device can comprise one or more of the features mentioned above.

In particular, the worn seat has been used previously in a first orientation and the worn seat is used in a second orientation in the torsion damping device.

The invention will be better understood upon reading the following description and with reference to the accompanying figures. The figures are given solely by way of entirely non-limiting illustration of the invention.

In the description and the claims, the terms "outer" and "inner", as well as the orientations "axial" and "radial", will be used to denote elements of the torsion damping device according to the definitions given in the description. The axis X of rotation of the damping device determines the "axial" orientation. An axial rotation is therefore a rotation about the axis X and axial clamping of an element limits, or even prevents, the translation of this element parallel to this axis X. The "radial" orientation is orthogonal to the axis X. The circumferential orientation is orthogonal to the axis X of rotation and orthogonal to the radial direction. In the radial direction, the terms "outer" and "inner" are used to define the relative position of one component with respect to another, with reference to the axis X of rotation; a component close to said axis is thus described as inner as opposed to an outer component situated radially at the periphery.

Figure 1:
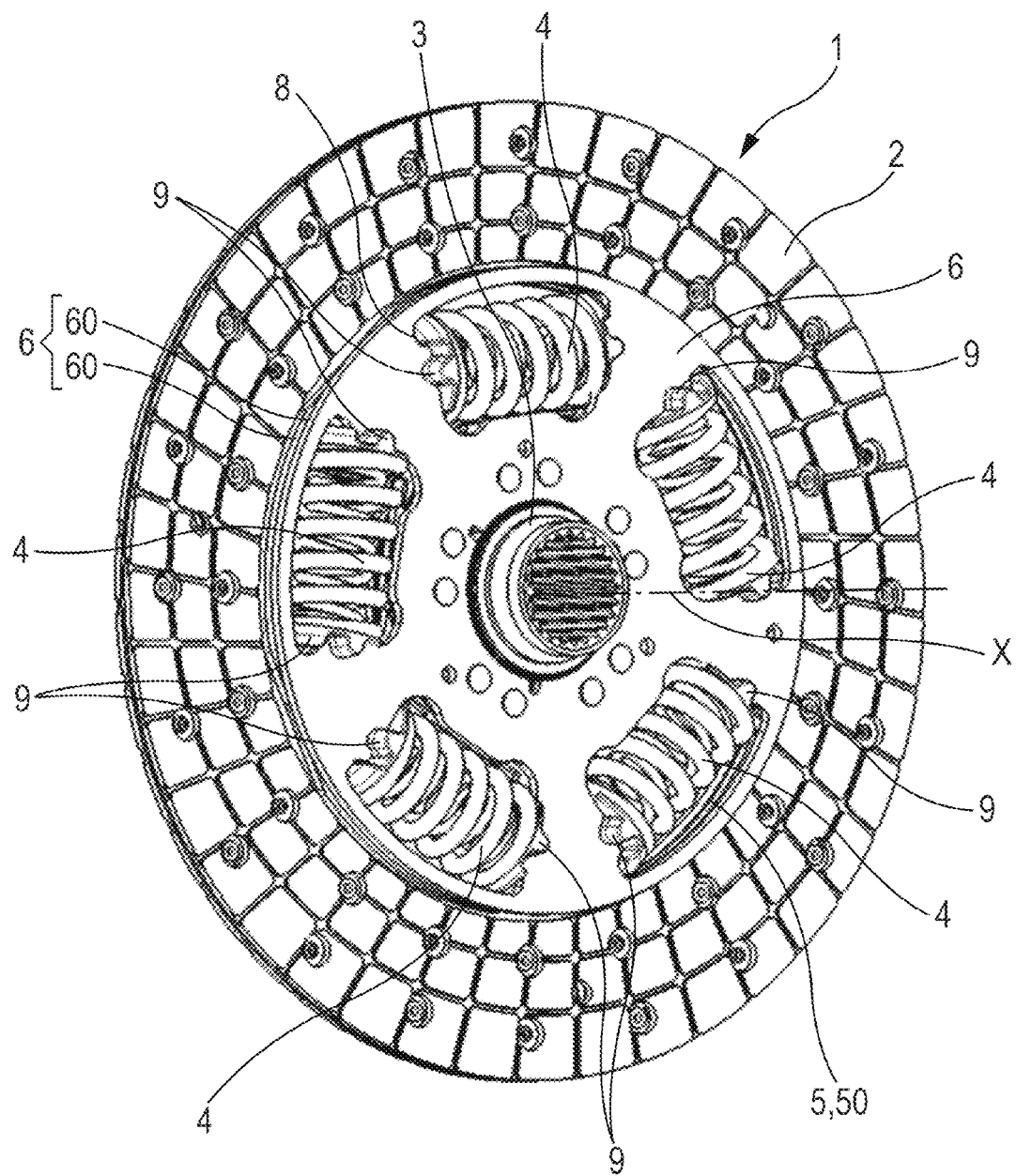
FIG. 1 illustrates a torsion damping device of the prior art.
Figure 2:
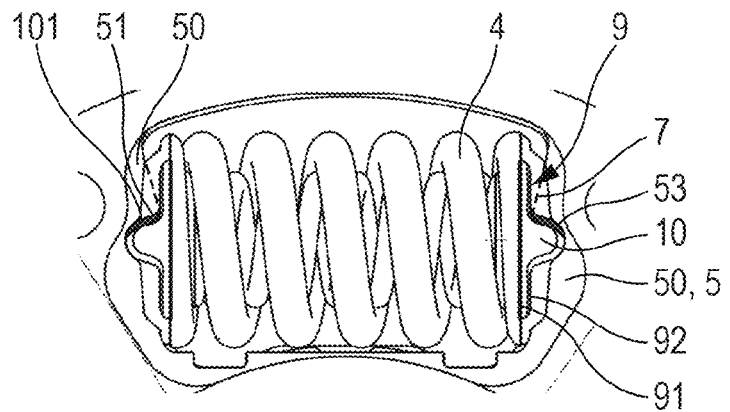
FIG. 2 illustrates an assembly comprising a spring and two seats of another torsion damping device of the prior art.
Figure 3:
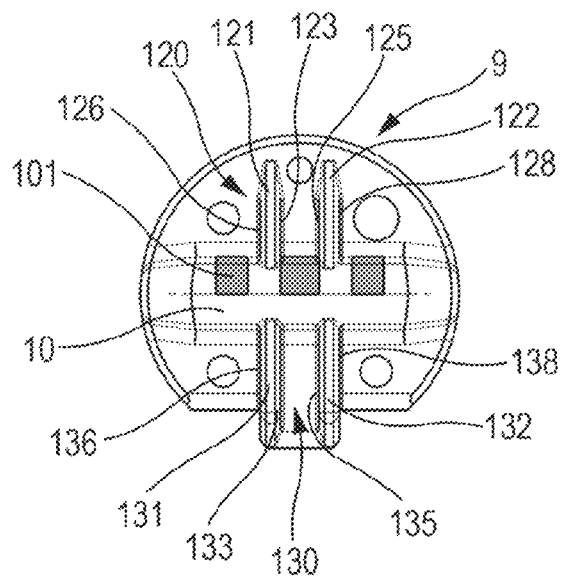
FIG. 3 illustrates a front view of a worn seat from FIG. 2.
Figure 4:
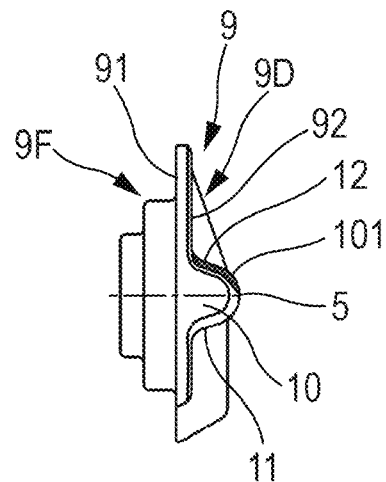
FIG. 4 illustrates a side view of a worn seat from FIG. 2.

FIG. 1 shows an example of a known torsion damping device 1 disclosed in patent application FR3079580. The damping device 1 is in this case associated with a friction disc 2 and a central hub 3 to form a clutch disc 1 suitable for being placed between the engine of a vehicle and the gearbox thereof. The friction disc 2 includes a circular friction lining. The friction lining is suitable for being selectively pressed by a clutch mechanism against a flywheel fixed to the engine of the vehicle in order to transmit torque between the engine and the friction disc. The central hub 3 is suitable for being coupled so that it is constrained to rotate, by means of its inner splines, with the input shaft of the gearbox of the vehicle. Torque can thus be transmitted between the friction disc 2 and the central hub 3 or vice versa, via the torsion damping device 1.

The torsion damping device 1 allows a relative rotational movement about the axis X between the central hub 3 and the friction disc 2 in order to permit the damping of torsional oscillations during the transmission of the torque. The torsion damping device includes, in this example, five springs 4 positioned circumferentially around the central hub 3. The torsion damping device is capable of compressing the springs 4 between a first coaxial part 5 and a second coaxial part 6 in order to provide damping. In this example, the second coaxial part 6 consists of a pair of lateral washers 60, also referred to as guide washers 60, which are rigidly connected to each other for conjoint rotation. The first coaxial part 5 comprises an intermediate washer 50, hereafter referred to as the flange 50, positioned axially between the two guide washers 60. In this example, the friction disc 2 is fixed to the flange 50, for example by means of rivets, and the two guide washers 60 are both fixed by rivets to the central hub 3, on either side of the flange 50. The guide washers 60 and the flange 50 thus constitute an axial stack of three discs with relative rotation possible between the flange 50 and the guide washers 60, which also corresponds, in the absence of a pre-damper, to the possible rotation between the friction disc 2 and the central hub 3.

For each spring 4, the flange 50 comprises an opening 7 and the guide washers 60 each comprise an opening 8. The corresponding spring 4 is mounted in the openings 7, 8 so that its ends each interact with one edge of the opening 7 and one edge of each opening 8. The ends of the spring 4 interact with the openings 7, 8 by means of two seats 9 each positioned at one end of the spring 4. Each of the seats 9 therefore presses against one edge of the opening 7 and against one edge of each of the openings 8.

Pivot lugs 10 are provided to allow the seats 9 to pivot relative to the flange 50 and relative to the guide washers 60.

At the level of each spring 4, when a relative axial rotational movement between the flange 50 and the two guide washers 60 occurs, one of the seats 9 is compressed only by the flange 50 and moves away from the edges of the openings 8 of the guide washers 60, while the other seat 9, on the opposite end of the spring 4, presses only on the guide washers 60 while the edge of the opening 7 of the flange 50 moves away. The spring 4 is thus compressed during the relative movements between the flange 50 and the guide washers 60 in order to perform the torsion damping function. The interaction between the ends of the spring 4 and the flange 50 and the guide washers 60 is optimized and made more reliable by the seats 9 which hold the spring 4 in place and provide an interface that prevents the ends of the spring 4 from becoming excessively damaged on contact with the flange 50 and with the guide washers 60.

The seats 9 also provide the satisfactory guiding of the spring 4 due to the pivot lugs 10 allowing compression of the spring 4 without spurious forces. The ends of the spring 4 remain substantially parallel to each other during the compression thereof, due to the pivot lugs 10.

FIGS. 2 to 5 show another known seat 9 of the prior art also having a pivot lug 10. The pivot lug 10 of the seat is in the form of a transverse bar extending substantially along a diameter of the seat 9. The seat shown is worn. It exhibits traces of wear 101.

The pivot lug 10 presses jointly on three pivot notches, namely the pivot notch 53 of the flange 50 in the centre and, axially on either side thereof, the two pivot notches 63 of the guide washers 60. The housing created by the three pivot notches 53, 63 thus receives the pivot lug 10, allowing it to pivot about an axis extending axially, that is, parallel to the axis of rotation X.

The pivot notch 53 is provided on the corresponding edge of the opening 7 and each pivot notch 63 is provided on a corresponding edge of the opening 8.

These seats 9 also include axial clamping arrangements, described below, including clamping walls that maintain the relative positions, in the axial direction, between the seat 9 and the flange 50 and between the seat 9 and the guide washers 60.

Each seat comprises a first clamping arrangement 120 and a second clamping arrangement 130 each comprising a first rib 121, 131 and a second rib 122, 132 between which an edge face of the flange 50 is inserted.

For each axial clamping arrangement, the first rib 121, 131 comprises an outer wall 126, 136 against which one of the two lateral washers 60 can press axially and an inner wall 123, 133 against which the flange 50 can press axially. Likewise, for each axial clamping arrangement 120, 130, the second rib 122, 132 comprises an outer wall 128, 138 against which the other of the two lateral washers 60 can press axially and an inner wall 125, 135 against which the flange 50 can press axially.

In other words, for each axial clamping arrangement, the edge faces of the two lateral washers 60 are positioned axially on either side of the two ribs 121, 122, 131, 132 and an edge face of the flange 50 is positioned axially between the two ribs.

When viewed in a plane perpendicular to the axis of rotation (X), the pivot lug 10 comprises:
a summit S,
an inner wall;
an outer wall connected to the first wall by means of the summit S and situated radially outside the inner wall.

When it is mounted and the damper is worn, this seat therefore exhibits traces of wear 101 situated partially or fully on the outer wall due to the centrifugal forces and the approach forces of the seat by one of the coaxial parts, as explained above.

Figure 5:
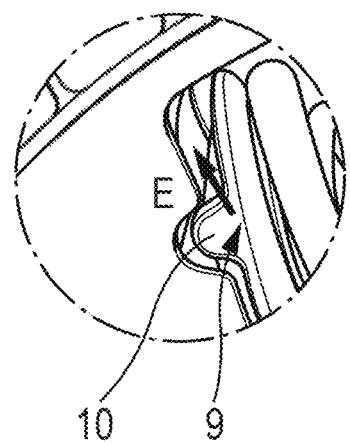
FIG. 5 illustrates the seat offset when it is subjected to centrifugal forces or when torque is transmitted.

In particular, the outer wall is capable of interacting with a bearing portion formed on the first coaxial part or the second coaxial part so that the worn seat is radially retained when it is subjected to centrifugal forces (FIG. 5).

Due to the centrifugal forces E and torque transmission forces, the traces of wear 101 appear on the outer wall of the pivot lug in the zones thereof that press on the flange 50 and the lateral washers 60. In other words, when they are worn, the seats in FIGS. 2 to 5 exhibit traces of wear 101 concentrated on the outer wall of the pivot lug 10.

It is not possible to turn this seat of the prior art around so that the second wall and the first wall of the pivot lug are reversed, as this seat has radially inner recesses on its outer outline into which portions of the lateral washers can pass. If this type of seat were to be mounted "back to front", there would therefore be undesirable interference between the lateral washers 60 of the damping device and the seat 9, in the radially inner part of the seat 9.

FIGS. 6 to 9 show a seat of a first embodiment of a torsion damping device. The first embodiment of a torsion damping device has coaxial parts 5, 6 and springs 4 of the same type as those illustrated in FIG. 1. Identical elements or elements that perform the same function as the elements described above have the same reference sign.

According to this first embodiment, the torsion damping device comprises a seat 9 that can be mounted in a first orientation O1 and in a second orientation O2, this seat 9 being a worn seat mounted in the second orientation O2 and bearing traces of wear 101 caused by previous use in the first orientation O1.

"Traces of wear" is given to mean wear marks visible to the naked eye.

Figure 6:
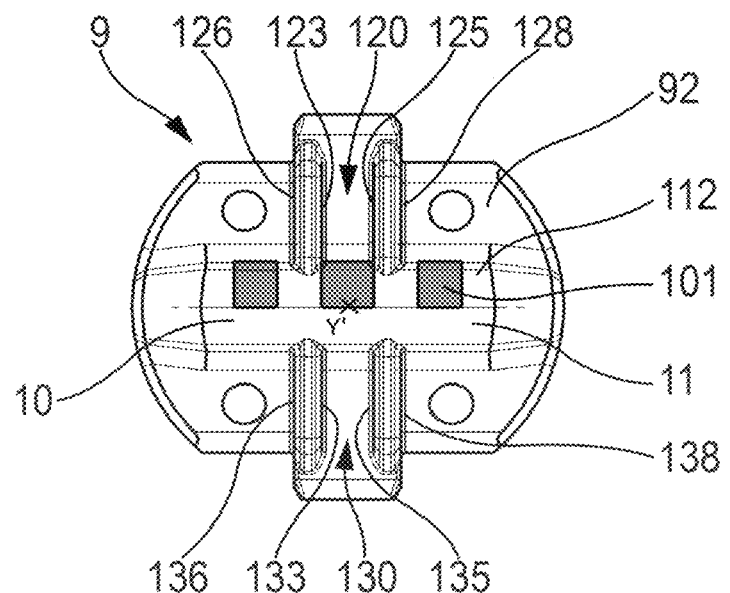
FIG. 6 illustrates a front view of a worn seat in a first embodiment of the invention.
Figure 7:
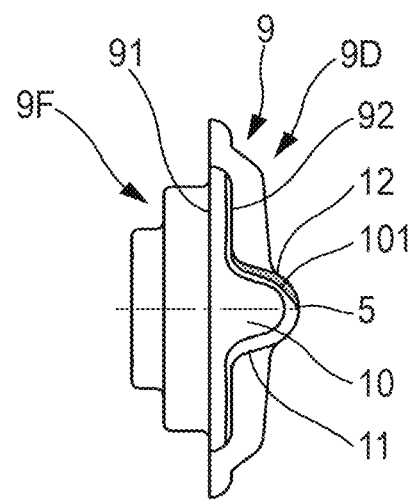
FIG. 7 illustrates a side view, in a plane perpendicular to the axis of rotation of the damper, of the worn seat in FIG. 6.

The seat 9 can be used initially in two different positions and be reused in one of the two positions in order to extend its service life. The seat illustrated in FIGS. 6 and 7 is suitable for such reuse.

This seat 9 comprises a frontal part 9F that presses against a spring end 4, and a dorsal part 9D that presses on the first coaxial part 5 and/or the second coaxial part 6.

The frontal part 9F comprises a frontal face arranged to press against a spring end 4. The frontal face of the worn seat 9 is arranged perpendicular to the axis Y of the spring.

The dorsal part 9D of each worn seat 9 comprises a dorsal face 92 and at least one pivot lug 10 protruding from the dorsal face 92 and arranged to press against the first coaxial part 5 and/or the second coaxial part 6.

In FIGS. 6 and 7, the traces of wear are situated on the first wall 12, which in this case is on the top, that is radially on the outside, when the seat is mounted in the damper, as FIGS. 6 and 7 illustrate a worn seat in its first orientation.

After a step of dismantling a worn damping device in which this seat is positioned in this first orientation, the seat is reused in a torsion damper according to the first embodiment of the invention so that the traces of wear 101 are situated partially or fully on the radially inner wall 12 (first wall 12). The second wall 11, which will be subjected to most stress during the "second use" of the seat, is thus in very good condition. The traces of wear 101, which are then located on the first wall 12 of the pivot lug, do not have any impact on the effectiveness of the torsion damping device. The switch from the previous first use of the seat in its first orientation O1 to its reuse (or second use) in its second orientation O2 is shown diagrammatically in FIG. 8. The second orientation O2 of the worn seat 9 in the torsion damping device 1 corresponds to the rotation of the worn seat by 180 degrees relative to its first orientation O1 in the worn damping device. The spring associated with the worn seat extends about an axis Y and the worn seat is rotated between its first orientation and its second orientation about an axis Y' of the seat substantially aligned with the axis Y of the spring with which it must interact. In other words, the worn seat 9 is reused back to front.

Figure 8:
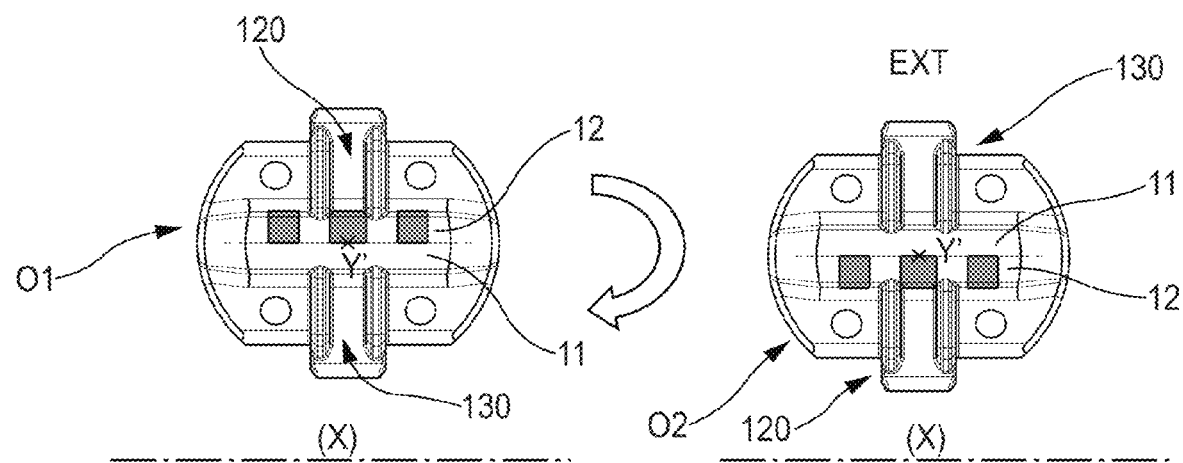
FIG. 8 illustrates the principle of turning around the worn seat in FIG. 6.

With reference to the right-hand part of FIG. 8, illustrating the worn seat in a plane perpendicular to the axis of rotation X in its second orientation O2, it can be seen that the pivot lug 10 comprises:
a summit S,
a first wall 12,
a second wall 11 connected to the first wall by means of the summit S and situated radially outside the first wall 12.

The traces of wear are situated in this case fully on the first wall 12.

The second wall 11 is capable of interacting with a bearing portion 51 formed on the first coaxial part 5 and/or on a complementary second bearing portion formed on the second coaxial part 6 so that the worn seat 9 is radially retained when it is subjected to centrifugal forces.

When the seat 9 is mounted within the torsion damping device, the pivot lug 10 extends in a direction parallel to the axis of rotation X. The summit S of the seat 9 is a crest that extends axially and separates the first wall and the second wall. The first wall 12 and the second wall 11 also extend in a direction parallel to the axis of rotation X.

Within the scope of the invention, it will be understood that the second wall 11 is situated, relative to the axis of rotation X of the torsion damper and in the second orientation O2, radially outside the first wall 12. When the seat 9 is mounted in the torsion damping device, particularly according to the first embodiment, its second wall 11 is facing radially outwards so that it is radially retained by the bearing portion formed on the first coaxial part 5 and/or the complementary second bearing portion formed on the second coaxial part 6.

In this case, as can be seen in the right-hand part of FIG. 8, the traces of wear 101 of each worn seat 9 are situated fully outside the second wall 11 when it is positioned for reuse in its second orientation.

The traces of wear 101 of the worn seat in FIG. 8 are in this case situated fully on the first wall 12.

The axis X is shown in FIG. 8 to distinguish between the two orientations O1 and O2. The distance separating it from the seat 9 has of course been shortened.

The worn seat 9 comprises a first axial clamping arrangement 120 comprising walls for axially clamping the worn seat relative to the first coaxial part 5 and the second coaxial part 6, and a second axial clamping arrangement 130 comprising walls for axially clamping the worn seat relative to the first coaxial part 5 and the second coaxial part 6.

The first axial clamping arrangement 120 and the second axial clamping arrangement 130 are arranged on either side of the pivot lug 10.

The axial clamping walls of the first axial clamping arrangement 120 are arranged in the same planes as the axial clamping walls of the second axial clamping arrangement 130.

The worn seat 9 has been used previously with the second axial clamping arrangement 130 positioned radially inside the pivot lug and the worn seat 9 is used in the torsion damping device with the first axial clamping arrangement 120 positioned radially inside the pivot lug 10.

The first clamping arrangement 120 and second clamping arrangement 130 each comprise a first rib 121, 131 and a second rib 122, 132 between which an edge face of the flange 50 is inserted. For each axial clamping arrangement 120, 130, the first rib 121, 131 comprises an outer wall 126, 136 against which one of the two lateral washers 60 can press axially and a first inner wall 123, 133 against which the flange 50 can press axially. For each axial clamping arrangement, the second rib 122, 132 comprises a second outer wall 128, 138 against which the other of the two lateral washers 60 can press axially and a first inner wall 133, 135 against which the flange 50 can press axially. In other words, for each axial clamping arrangement 120, 130, the edge faces of the two lateral washers 60 are positioned axially on either side of the two ribs 121, 122, 131, 132 and an edge face of the flange 50 is positioned axially between these two ribs.

The first axial clamping arrangement 120 is symmetrical to the second axial clamping arrangement 130 relative to the axis of rotation Y of the worn seat used to switch it from the first orientation O1 to the second orientation O2. The axial clamping is thus identical in the first orientation O1 and the second orientation O2 of the seat 9.

The worn seat 9 has an outline that has an axis of symmetry. The axis of rotation Y' of the seat is therefore an axis of symmetry. Unlike the known seat in FIGS. 3 and 4, this seat can therefore be mounted in both orientations O1 and O2.

Figure 9:
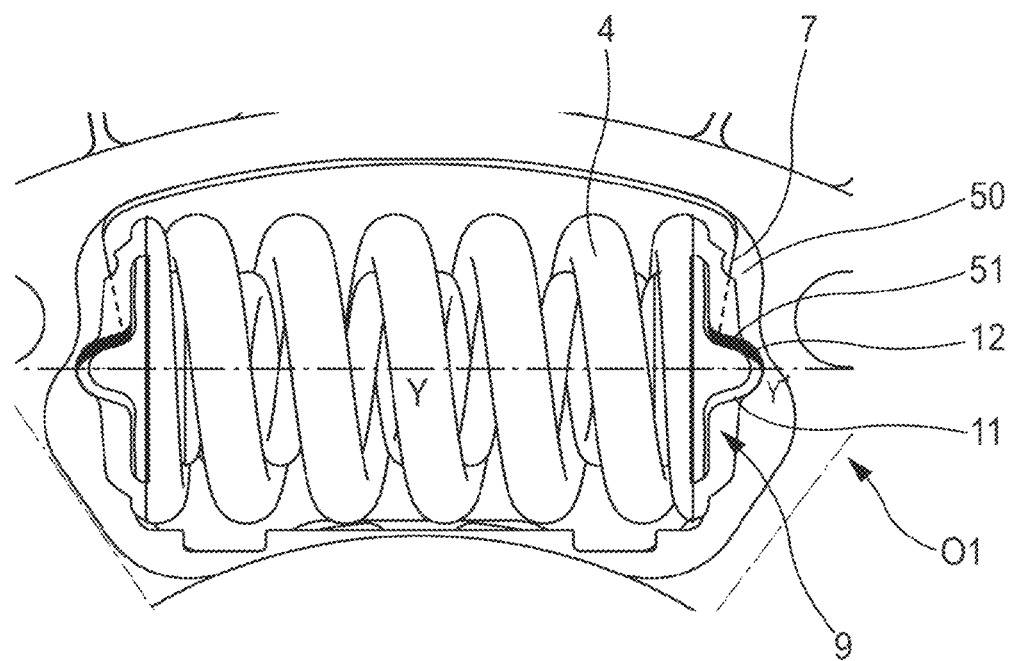
FIG. 9 illustrates an assembly comprising a spring and two seats in a second embodiment of the invention.
Figure 10:
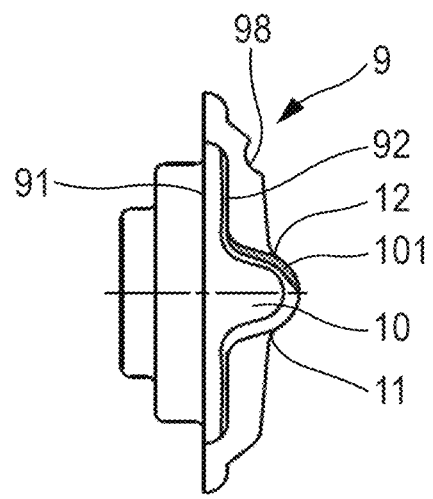
FIG. 10 illustrates a side view, in a plane perpendicular to the axis of rotation of the damper, of a worn seat from FIG. 9.
Figure 11:
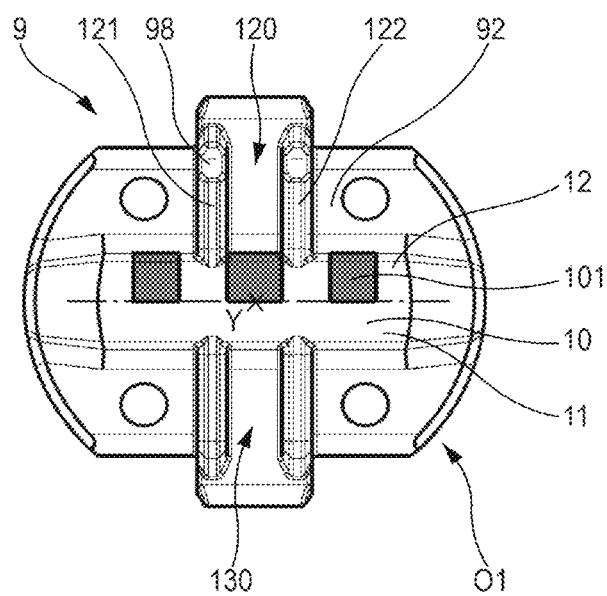
FIG. 11 illustrates a front view of the worn seat in FIG. 10.

According to a second embodiment shown in FIGS. 9 to 11, the torsion damping device comprises a worn seat 9 provided with a mounting poka-yoke 98 suitable for preventing the worn seat 9 from being mounted in the torsion damping device in the first orientation O1.

FIGS. 9 to 11 illustrate a worn seat in its first orientation O1.

As can be seen in FIG. 11, the symmetry of the worn seat is only broken by the mounting poka-yoke 98 and the traces of wear 101.

The poka-yoke 98 of the worn seat is in this case formed on the first axial clamping arrangement 120, on its ribs 121, 131. In this case, the poka-yoke takes the form of cavities 98.

According to one variant, not illustrated, the traces of wear are not concentrated on a pivot lug by on another type of bearing relief.

The invention also relates to a method for manufacturing a torsion damper including a first coaxial part and a second coaxial part rotatably mounted relative to each other about an axis of rotation X, springs housed in recesses in the first and second coaxial parts and acting circumferentially between the first coaxial part and the second coaxial part so that they elastically oppose the relative rotation of the first coaxial part and the second coaxial part about the axis of rotation X, a plurality of seats, each seat comprising a frontal part that presses against a spring end and a dorsal part pressing on the first coaxial part and/or the second coaxial part, the manufacturing method comprising the following steps:

supplying a worn seat 9 exhibiting traces of wear and originating from a worn damping device, mounting the worn seat 9 on a spring 4 of the torsion damping device, arranging the assembly comprising the worn seat 9 and the spring 4 in the recesses in the first and second coaxial parts.

Preferably, each worn seat 9 is capable of being mounted in a first orientation O1 and in a second orientation O2, the worn seat being mounted in the first orientation in the worn damping device, and the step of arranging the assembly comprising the worn seat and the spring being such that the worn seat is mounted in the second orientation in the recesses in the first and second coaxial parts.

The dorsal part 9D of each worn seat comprises a dorsal face and at least one pivot lug 10 protruding from the dorsal face 92 and arranged to press against the first coaxial part 5 and/or the second coaxial part 6, the assembly comprising the worn seat and the spring 4 being positioned so that said at least one pivot lug 10 comprises, when viewed in a plane perpendicular to the axis X:

a summit S, a second wall 11 arranged radially outside the summit S, a first wall 12, arranged radially inside the summit S and connected to the second wall via the summit S, the traces of wear 101 being essentially, or even fully, situated on the first wall 12 of said at least one pivot lug 10.

The worn seat 9 comprises a first axial clamping arrangement 120 and a second axial clamping arrangement 130 suitable for interacting with first and second coaxial parts 5 and 6 of the torsion damping device 1, the first axial clamping arrangement 120 and the second axial clamping arrangement 130 being situated on either side of the pivot lug 10 of the worn seat 9, the worn seat 9 having been used previously, in the first orientation O1, with the first axial clamping arrangement 130 positioned radially inside the pivot lug 10 and the worn seat 9 being suitable for use in the torsion damping device, in the second orientation O2, with the first axial clamping arrangement 120 positioned radially inside the pivot lug 10.

In the embodiment in FIGS. 9 to 14, the worn seat 9 includes a mounting poka-yoke 98 and the assembly comprising the worn seat and the spring passes through a mounting template before being introduced into the recesses in the first and second coaxial parts 5 and 6, the mounting template including a complementary poka-yoke interacting with the mounting poka-yoke 98.

Figure 12:
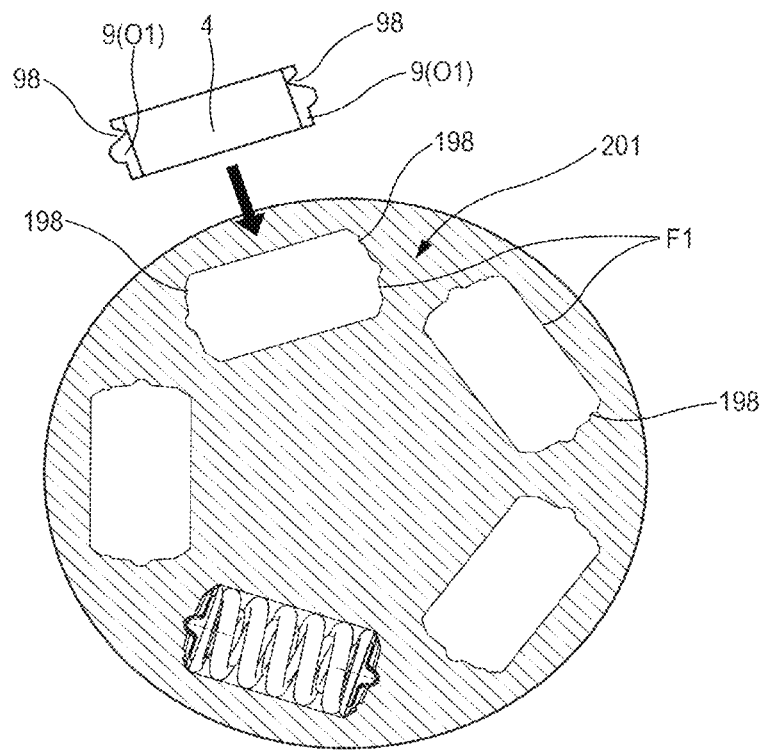
FIG. 12 illustrates a first template for mounting an assembly comprising a spring and two new seats.
Figure 13:
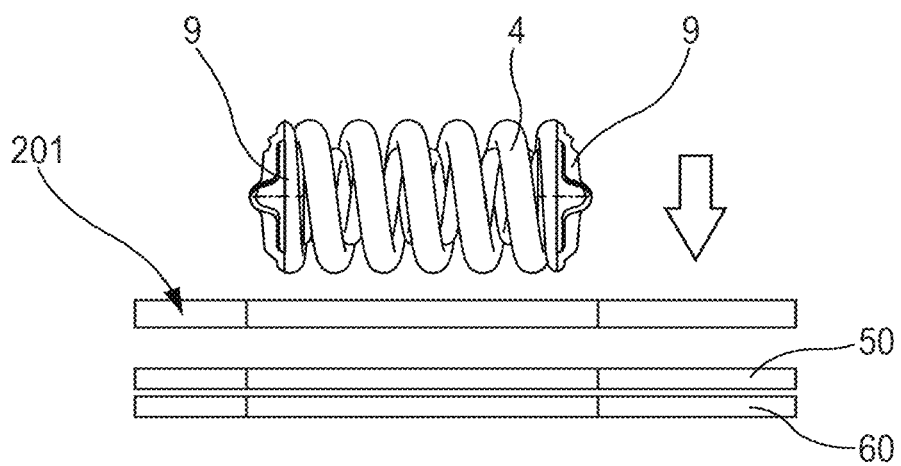
FIG. 13 illustrates the step of inserting the assembly comprising the spring and the seats.
Figure 14:
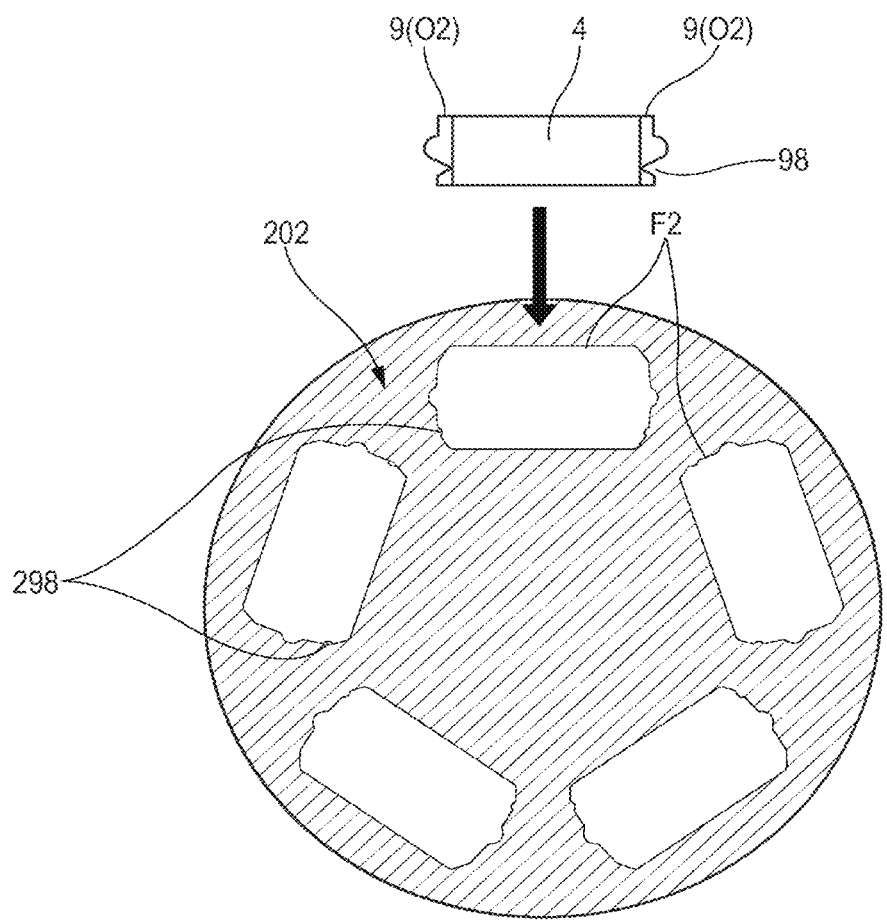
FIG. 14 illustrates a second template for mounting an assembly comprising a spring and two worn seats, in order to manufacture a torsion damping device according to the second embodiment.

Two mounting templates can be used. The orientations of the seats in FIGS. 12 and 14 are shown in brackets.

A first mounting template 201 can be used with new seats 9 provided with a poka-yoke 98.

The complementary poka-yoke 198 of the first mounting template 201 is arranged so that the first mounting template 201 only permits the passage of the new seat 9 in the first orientation O1.

After they have been removed from a worn damping device, a second mounting template 202 can be used to re-mount the worn seats in a torsion damping device.

The complementary poka-yoke 298 of the second mounting template 202 is arranged so that the second mounting template 202 only permits the passage of the worn seat 9 in the second orientation O2. In this case, the complementary poka-yoke 298 of the second mounting template 202 is in a radially inner zone of the opening through which the spring passes, while the complementary poka-yoke 198 of the first mounting template 201 is in a radially outer zone of the opening through which the spring passes. The seat cannot thus be re-mounted in the "worn" position O1.

In this case, the poka-yoke is formed by two cavities 98 formed in the seat 9, more specifically in the axial clamping ribs 121 and 122. The complementary poka-yoke 198, 298 of the first and second mounting templates is a protrusion 198, 298. The cavity 98 slides around the protrusion 198, 298 during the mounting of the assembly comprising the seats 9 and the spring 4 in the first and second coaxial parts.

According to one variant, the cavity is formed on the mounting template and the protrusion is formed on the seat.

The manufacturing method can be implemented in two different contexts.

In a first context, damping devices are manufactured with worn seats 9. In this case, the worn seats 9 originate from different worn dampers that have been dismantled and the worn seats of which have been retained and stored for reuse.

In a second implementation context, the worn dampers are repaired and their worn seats 9 are re-mounted back to front. The lateral washers 60 and the intermediate washer 50 of such dampers can for example be unchanged.

It will be understood that during the second life cycle of the worn seat, new traces of wear, not shown in the right-hand part of FIG. 8, will appear on the second wall 11 (second orientation of the seat).

Figure 15:
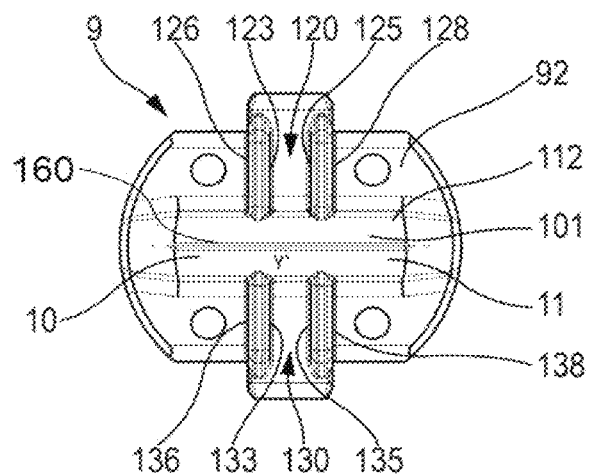
FIG. 15, FIG. 16 and FIG. 17 illustrate variant embodiments.
Figure 16:
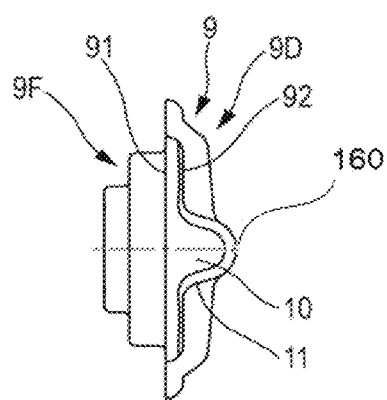

Another variant of the seat is shown in FIGS. 15 and 16. The summit S comprises a demarcation groove 160 separating the first wall 12 from the second wall 11.

The seats pivot about an axis parallel to the axis of rotation X of the damping device and the bearing reliefs 10 are pivot lugs.

Figure 17:
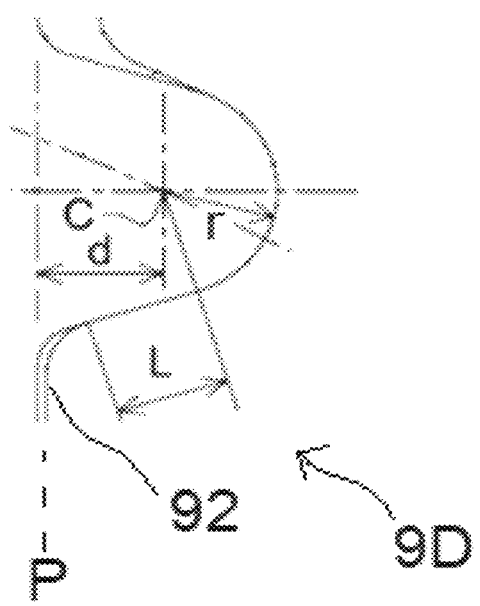

As can be seen in FIG. 17, it is advantageous for the seats to be able to pivot and for the pivot of the seat to be offset. The dorsal face 92 of the dorsal part 9D is arranged on a plane P and the bearing relief is a bar portion having, on one surface, a substantially circular cross section of centre C. The bar portion forms one element of a pivot connection, the axis of the bar portion passing through the centre C of the bar portion and extending at a predetermined distance d not substantially equal to zero from the plane P. As a preference, for a radius r of the substantially circular cross section of the bar portion, d>r/3 and preferably d>r/2, in particular d>2r/3 and notably d>r.

According to other variant embodiments, the friction disc can be mounted on a lateral washer and the central drive hub of the gearbox input shaft can be coupled to the flange.

In the case of a dual-mass flywheel, the second coaxial part can be formed by a primary flywheel optionally provided with a cover and the first coaxial part can be formed by a flange coupled to the secondary flywheel.

The invention claimed is:

1. A seat for a torsion damping device comprising:
   a frontal part which is intended to press against one end of a spring; and a dorsal part which is intended to press against at least one of a first coaxial part and a second coaxial part of the torsion damping device, wherein the seat can be mounted in a first orientation and in a second orientation in the torsion damping device, wherein the dorsal part comprises a dorsal face and a bearing relief protruding from the dorsal face and intended to press against at least one of the first coaxial part and the second coaxial part, the bearing relief comprising, when viewed in a plane perpendicular to an axis of rotation:
- a summit,
- a first wall, and
- a second wall connected to the first wall by the summit and situated radially outside the first wall,
- the first wall and the second wall being arranged on either side of an axis perpendicular to the dorsal face and passing through the summit, and wherein the summit comprises a demarcation separating the first wall from the second wall.

2. The seat according to claim 1, in which wherein the bearing relief extends in a direction parallel to the axis of rotation.

3. The seat according to claim 1, wherein the demarcation is a groove.

4. The seat according to claim 1, wherein the seat is a seat intended to pivot about an axis parallel to the axis of rotation of the torsion damping device and said bearing relief is a pivot lug, wherein:
- the dorsal part is arranged in a plane and the bearing relief is a bar portion having, on one surface, a substantially circular cross section of center, the bar portion forming one element of a pivot connection, an axis of the bar portion passing through the center of the bar portion extending at a predetermined distance, d, not substantially equal to zero from the plane P; and
- for a radius, r, of the substantially circular cross section of the bar portion, $d > r/3$.

5. The seat according to claim 4, wherein a first axial clamping arrangement comprising walls for axially clamping the seat relative to the first coaxial part and the second coaxial part, and a second axial clamping arrangement comprising walls for axially clamping the seat relative to the first coaxial part and the second coaxial part, the first axial clamping arrangement and the second axial clamping arrangement being arranged on either side of the pivot lug, the axial clamping walls of the first axial clamping arrangement being arranged in same planes as the axial clamping walls of the second axial clamping arrangement.

6. The seat according to claim 1, wherein the seat comprises a mounting poka-yoke.

7. The seat according to claim 1, wherein the second orientation of the seat corresponds to a rotation of the seat by 180 degrees relative to the first orientation.

8. The seat according to claim 1, wherein the demarcation is a line marked across the summit of the seat.

9. The seat according to claim 1, wherein the demarcation extends along an axis parallel to the axis of rotation.

10. A torsion damping device comprising:
- a first coaxial part and a second coaxial part rotatably mounted relative to each other about an axis of rotation, springs acting circumferentially between the first coaxial part and the second coaxial part so that they elastically oppose the relative rotation of the first coaxial part and the second coaxial part about the axis of rotation,
- a plurality of seats, each seat comprising, a frontal part that presses against an end of a spring (4), and, a dorsal part pressing on at least one of the first coaxial part and the second coaxial part,
- wherein at least one of the seats can be mounted in a first orientation and in a second orientation in the torsion damping device,
- wherein the dorsal part of the at least one of the seats comprises a dorsal face and a bearing relief protruding from the dorsal face and arranged to press against at least one of the first coaxial part and the second coaxial part, the bearing relief comprising, when viewed in a plane perpendicular to an axis of rotation:
  - a summit,
  - a first wall, and
  - a second wall connected to the first wall by the summit and situated radially outside the first wall,
  - the first wall and the second wall being arranged on either side of an axis perpendicular to the dorsal face and passing through the summit, and
- wherein the summit comprises a demarcation separating the first wall from the second wall.

11. The torsion damping device according to claim 10, wherein said at least one of the seats is a worn seat exhibiting traces of wear caused by previous use in the first orientation.

12. The torsion damping device according to claim 11, wherein the traces of wear are situated partially or fully on the first wall.

13. The torsion damping device according to claim 11, wherein the traces of wear of each worn seat are situated partially or fully outside the second wall.

14. The torsion damping device according to claim 11, wherein the traces of wear of each worn seat are situated partially or fully on the first wall.

15. A method for manufacturing a torsion damper including a first coaxial part and a second coaxial part rotatably mounted relative to each other about an axis of rotation, springs housed in recesses in the first and second coaxial parts and acting circumferentially between the first coaxial part and the second coaxial part so that the springs elastically oppose relative rotation of the first coaxial part and the second coaxial part about the axis of rotation, a plurality of seats, each seat comprising a frontal part that presses against an end of a spring, and a dorsal part pressing on at least one of the first coaxial part and the second coaxial part, the manufacturing method comprising:
- supplying a worn seat exhibiting traces of wear,
- mounting the worn seat on a spring,
- inserting the assembly comprising the worn seat and the spring into a recess in the first coaxial part and into a recess in the second coaxial part,
- wherein the worn seat can be mounted in a first orientation and in a second orientation in the torsion damping device,
- wherein the dorsal part of the worn seat comprises a dorsal face and a bearing relief protruding from the dorsal face and arranged to press against at least one of the first coaxial part and the second coaxial part, the bearing relief comprising, when viewed in a plane perpendicular to an axis of rotation;
  - a summit,
  - a first wall, and
  - a second wall connected to the first wall by the summit and situated radially outside the first wall,
  - the first wall and the second wall being arranged on either side of an axis perpendicular to the dorsal face and passing through the summit, and wherein the summit comprises a demarcation separating the first wall from the second wall.

16. The method for manufacturing a torsion damper according to claim 15, wherein the worn seat was mounted in the first orientation during a previous use, the inserting the assembly comprising the worn seat and the spring being such that the worn seat is mounted in the second orientation in the recesses in the first and second coaxial parts.

17. The method for manufacturing a torsion damper according to claim 15, wherein the worn seat includes a mounting poka-yoke and, during the inserting the assembly comprising the worn seat and the spring into the first and second coaxial parts, the assembly comprising the worn seat and the spring passes through a mounting template before being introduced into the recesses in the first and second coaxial parts, the mounting template including a complementary poka-yoke, the complementary poka-yoke being arranged so that the mounting template only permits the passage of the worn seat in the second orientation.

18. The method for manufacturing a torsion damper according to claim 15, wherein the inserting the assembly comprising the spring and the bearing seats being such that the first wall is located in the torsion damping device radially inside the second wall.

19. The method for manufacturing a torsion damper according to claim 15, wherein, prior to supplying the worn seat exhibiting traces of wear, the manufacturing method comprises:
dismantling a worn damper,
storing seats from the worn damper.

20. The method for manufacturing a torsion damper according to claim 19, wherein one of the first coaxial part and the second coaxial part comprises two lateral washers rigidly connected to each other for conjoint rotation about the axis of rotation, and the other of the first coaxial part and the second coaxial part comprises an intermediate washer, the two lateral washers and the intermediate washer originating from the worn damper.

* * * * *